United States Patent [19]

Ohkawa et al.

[11] Patent Number: 4,666,759
[45] Date of Patent: May 19, 1987

[54] DATA RECORDING MEDIUM

[75] Inventors: Hideki Ohkawa, Tokyo; Katsutarou Ichihara, Kawagoe; Yoshiaki Terashima, Yokosuka; Nobuaki Yasuda, Zushi, all of Japan

[73] Assignee: Kabushiki Kaisha Toshiba, Kawasaki, Japan

[21] Appl. No.: 746,728

[22] Filed: Jun. 20, 1985

[30] Foreign Application Priority Data

Jun. 30, 1984 [JP] Japan .................. 59-135979
Jun. 30, 1984 [JP] Japan .................. 59-135980

[51] Int. Cl.⁴ .............................................. G11B 7/24
[52] U.S. Cl. ..................... 428/213; 428/215; 428/332; 428/336; 428/469; 428/472; 428/694; 428/900
[58] Field of Search .......... 428/694, 692, 213, 900, 428/215, 332, 469, 336, 472; 365/122; 360/131, 134; 369/288, 13

[56] References Cited

U.S. PATENT DOCUMENTS

| | | | |
|---|---|---|---|
| 3,460,968 | 8/1969 | Bate et al. | 428/472 |
| 3,492,158 | 1/1970 | Scow et al. | 428/694 |
| 3,498,837 | 3/1970 | Alstad et al. | 428/694 |
| 3,719,525 | 3/1973 | Patel et al. | 204/38.3 |
| 4,042,341 | 8/1977 | Smeggil | 428/900 |
| 4,268,369 | 5/1981 | Barlow et al. | 427/131 |
| 4,272,563 | 6/1981 | Steck et al. | 427/130 |
| 4,388,367 | 6/1983 | Chen et al. | 428/694 |
| 4,405,677 | 9/1983 | Chen | 428/694 |
| 4,565,734 | 1/1986 | Arai et al. | 428/694 |

FOREIGN PATENT DOCUMENTS

| | | |
|---|---|---|
| 1279427 | 10/1968 | Fed. Rep. of Germany . |
| 1965482 | 9/1973 | Fed. Rep. of Germany . |
| 2608022 | 9/1977 | Fed. Rep. of Germany . |
| 3117931 | 2/1982 | Fed. Rep. of Germany . |
| 3140531 | 5/1982 | Fed. Rep. of Germany . |

OTHER PUBLICATIONS

Z. Szklarska-Smialowska and Kozlowski, J. Electrochem. Soc., 131, 234 (1984).
T. Ohtsuka and N. Sato, Nippon Kinzoku Gakkaishi, 39, 60 (1975).

*Primary Examiner*—Marion C. McCamish
*Assistant Examiner*—William M. Atkinson
*Attorney, Agent, or Firm*—Oblon, Fisher, Spivak, McClelland & Maier

[57] ABSTRACT

A data recording medium comprising, as a recording layer, a thin magnetic alloy film having an axis of easy magnetization along a direction perpendicular to the surface thereof, and an anticorrosion protective layer formed on the recording layer. This recording medium is featured in that the anticorrosion protective layer is formed of a thin oxide film which is obtained by subjecting the surface portion of the recording layer to an anodic oxidization. This protective layer may be further covered with a dielectric film as a second protective covering.

12 Claims, 4 Drawing Figures

DATA RECORDING MEDIUM

BACKGROUND OF THE INVENTION (a) Field of the Invention

The present invention relates to a data recording medium having a thin magnetic alloy film as a recording layer and, more particularly, to a data recording medium having an anticorrosion protective film on the recording layer.

(b) Description of the Prior Art

A magneto-optical recording medium is receiving a great deal of attention as an optical disk capable of data read, write and erase operations upon radiation of a light beam such as a laser beam. A conventional magneto-optical recording medium of this type has a structure wherein a thin magnetic alloy film having an easy axis of magnetization in a direction perpendicular to a film surface is formed on a substrate as a recording layer. When a portion of the recording layer is heated to near the Curie point upon irradiation with an optical beam modulated in accordance with a data signal, data is recorded in the form of inversion of magnetization. In the read mode, a light beam irradiates a local portion of the recording layer which is subjected to inversion of magnetization, and rotation (i.e., polar-Kerr effect) of a polarization plane of the beam reflected from the recording layer surface is utilized to read the data.

Thin amorphous films of rare earth metal-transition metal alloys such as TbFe, DyFe, GdTbFe, TbFeCo and GdTbFeCo (known as a Curie point recording medium), or such as GdFe, GdCo, TbCo and GdTbCo (known as a compensation temperature recording medium) are known as conventional magnetic recording layers of the magneto-optical medium. These films have large Kerr rotation angles $\theta K$ practically, and have a merit that a large uniform recording layer can' be formed by using simple methods e.g. sputtering, vacuum evaporation. In addition, these films have high recording efficiency at a low optothermal energy level so that a laser diode can be used for the recording operation.

When such a thin amorphous film of a rare earth metal-transition metal alloy is used as the recording layer of the magneto-optical recording medium, it generally has poor anticorrosion properties, particularly in the case of Curie point recording medium, which is the largest obstacle to the practical application of the alloy film in the magneto-optical recording medium. For this reason, according to a conventional technique, a transparent dielectric film is formed on the recording medium so as to improve the anticorrosion properties of such a film. However, since a $SiO_2$ or a SiO film used as a dielectric film is formed by RF sputtering or the like, defects such as pinholes are formed in the film due to contamination during sputtering. Therefore, when the recording medium is used for a long time, moisture in the air penetrates the defects and corrodes the recording layer. This corrosion phenomenon is more prominent in the case of Curie point recording medium. The dielectric film cannot effectively improve the anticorrosion properties of the recording film. In addition to the magneto-optical recording medium, even in the conventional normal magnetic recording media, especially those using a thin magnetic alloy film such as Co-Cr as a recording layer, a dielectric film must be formed as a protective film on the recording layer, thus presenting the same problem as described above.

SUMMARY OF THE INVENTION

It is an object of the present invention to provide a data recording medium wherein anticorrosion properties of a thin magnetic alloy film as a recording layer are improved.

It is another object of the present invention to provide a data recording medium wherein a high-density anticorrosion protective film free from pinholes is formed on a recording layer with good adhesion.

In order to achieve the above objects of the present invention, there is provided a data recording medium having as a recording layer a thin magnetic alloy film having an easy axis of magnetization in a direction perpendicular to a film surface and a protective film formed on the recording layer, characterized in that the protective film comprises a thin oxide film formed by anodic oxidation of a surface layer of the recording layer, or a two-layer structure of the thin oxide film and a dielectric film formed on the thin oxide film.

The oxide film formed on the recording layer of the data recording medium can be performed by wet or dry anodic oxidation. According to wet anodic oxidation, any one of a boric acid solution, a boric acid-borate buffer solution, a phosphoric acid-phosphate buffer solution, an aqueous phosphate solution, a solution mixture of ethylene glycol, water and alkali metal hydroxide, and a solution mixture of ethylene glycol, water and nitrate, or any one of a formic acid-formate buffer solution, an acetic acid-acetate buffer solution and a propionic acid-propionate buffer solution can be employed. Electrolysis is performed using the recording layer as an anode to form a dense oxide film on the recording layer.

According to dry anodic oxidation, the pressure of a gas mixture of an oxygen type gas such as $O_2$ gas or $CO_2$ gas and a rare gas such as Ar gas is reduced to a vacuum pressure of $10^{-3}$ Torr to 10 Torr, and power is externally supplied to generate a plasma atmosphere. The potential at the recording layer is biased to a positive potential, and oxygen radicals and oxygen ions are effectively incident on the recording layer in the plasma. Alternatively, a voltage is not applied to the recording layer, but the recording layer is exposed in the oxygen type gas plasma, thereby utilizing the oxygen radicals. Unlike wet anodic oxidation, dry anodic oxidation provides an oxide film without bonding water.

The dielectric film formed on the recording layer treated with an anodic oxidation comprises a conventional transparent dielectric film of at least one material selected from the group consisting of a semiconductor metal oxide and a semiconductor metal nitride (e.g., AlN or $SiO_2$).

The thickness of a thin oxide film formed by anodic oxidation on the recording layer falls within the range of several tens of angstroms to 300 Å and preferably 50 Å to 300 Å. When the thickness of the thin oxide film is smaller than several tens of angstroms, a uniform film cannot be formed. The film thickness does not have an upper limit. However, even if the thickness exceeds 300 Å, no benefit is obtained and adverse effects on the recording layer may result.

In order to obtain a uniform dielectric film, its thickness must exceed 50 Å. An upper limit can be properly determined in association with production efficiency.

According to the present invention, since the first protective film of the protective film structure of the recording layer comprises a thin oxide film whose components are the same as those of the recording layer, unlike the conventional structure wherein only the dielectric film is formed as the protective layer by sputtering or the like, the film is dense and defects such as pinholes do not occur. In addition, since the first protective layer is obtained such that a surface portion of the recording layer is converted to an oxide, good adhesion between the recording layer and the protective film is provided.

Furthermore, since a second protective layer made of a dielectric film is formed, if necessary, on the first protective film formed as the thin oxide film by anodic oxidation on the recording layer, anticorrosion properties are greatly improved as compared with the case wherein only the dielectric film or the thin oxide film is used as the protective film. More particularly, the first protective layer is substantially free from defects such as pinholes. However, since the first protective layer is formed by anodic oxidation, it is difficult to obtain a film having a sufficient thickness. When anodic oxidation is performed in an aqueous solution, water is contained as bonding water in the film. When the thin oxide film obtained by wet anodic oxidation is exposed to the outer atmosphere, the content of bonding water in the film changes depending on the atmospheric conditions, thereby degrading anticorrosion properties. However, when the protective film structure comprises the first and second protective layers, the thin oxide film obtained by anodic oxidation is sealed from the outer atmosphere, thereby preventing a change in content of bonding water. In this manner, the drawbacks of the thin oxide film and the dielectric film are cancelled by each other. As a result, a protective film having good anticorrosion properties can be obtained.

It should be noted that the second protective film need not be formed when the thin oxide film is formed by dry anodic oxidation such as plasma anodic oxidation since no bonding water is contained in the film.

DETAILED DESCRIPTION OF THE PREFERRED EMBODIMENTS

Figure 1:
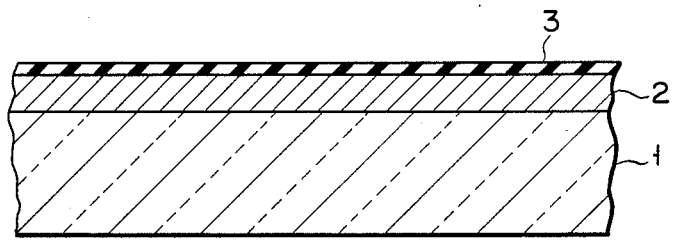
FIG. 1 is a sectional view of a data recording medium according to an embodiment of the present invention.

FIG. 1 is a sectional view of a data recording medium according to an embodiment of the present invention. Referring to FIG. 1, a substrate 1 comprises a glass substrate. A recording layer 2 is formed on the substrate 1. The recording layer 2 comprises a thin amorphous film of a rare earth metal-transition metal alloy such as TbFe, GdFe, GdTbFe, TbFeCo, GdTbFeCo, TbCo, GdCo, TbDyFe or GdDyFe, GdTbCo, which has an axis of easy magnetization in a direction perpendicular to a film surface. By oxidizing a surface portion of the recording layer 2 by anodic oxidation, a protective film 3 is formed on the recording layer 2.

The manufacturing process will be described by way of examples wherein a magneto-optical recording medium has a TbFe film as the recording layer 2. In the following description, wet and dry anodic oxidation methods are separately described.

(Wet Anodic Oxidation)

An RF sputtering apparatus was prepared to form the recording layer. A 10-mm square Tb pellet was placed on a 5" Fe disk target such that the area of the pellet was 39% of the total area of the target. Ar gas at a pressure of 5 mTorr was supplied at a flow rate of 10 SCCM to perform sputtering, thereby forming a recording layer 2 on the glass substrate 1 to a thickness of 1,000 Å. In was compressively bonded to the surface of the TbFe film to achieve electric conduction. Thin anodic oxidation films were formed as protective films by constant-voltage electrolysis in accordance with treatment methods No. 1 to No. 6 in Table 1, respectively. Each protective film had a thickness of 200 Å.

It should be noted that the preset potentials are given at a saturated calomel electrode (SCE).

TABLE 1

| No. | Treatment solution | pH | Preset potential (mV) | Treatment time (H) | Treatment temperature (°C.) |
|---|---|---|---|---|---|
| 1 | 0.15N—$H_3BO_3$ + 0.15N—$Na_2B_4O_7$ | 8.4–8.5 | +700 | 1 | 25 |
| 2 | 0.15N—$Na_2HPO_4$ | 9.1 | +700 | 1 | 25 |
| 3 | (0.1N—KOH):$HOCH_2CH_2OH$ = 1:9 | 13 | +800 | 1 | 25 |
| 4 | 0.15N—HCOOH 0.15N—HCOOK | 4– | +700 | 1 | 25 |
| 5 | 0.15N—$CH_3COOH$ 0.15N—$CH_3COOK$ | 5 | +700 | 1 | 25 |
| 6 | 0.15N—$CH_3COOH$ 0.15H—$CH_3COOH$ | 6 | +800 | 1 | 25 |

(Dry Anodic Oxidation)

A TbFe film was formed on a substrate 1 as a recording layer 2 to a thickness of 1,000 Å in the same manner as in wet anodic oxidation. The apparatus was evacuated, and a mixture gas of $O_2$ gas (20%) and Ar gas (80%) was supplied thereto to maintain a gas pressure at 1 Torr. A shutter was inserted between the target and the substrate, and RF power was supplied to a coil arranged above the shutter, so that an $O_2$-Ar gas plasma was generated at the upper surface of the recording layer. At the same time, an external voltage of +100 V (with respect to the ground potential) was externally applied to the recording layer. Plasma anodic oxidation was performed at RF power of 100 W for about 5 minutes, thereby forming an anodic oxide film as a protective film 3 to a thickness d of 200 Å.

The resultant film is shown as No. 7 in Table 2. As Comparative Examples, other films obtained by different anodic oxidation conditions are also shown as Nos. 8 to 12.

TABLE 2

| No. | Gaseous atmosphere | Recording layer bias voltage | Oxide film formation rate (Average rate upon growing 200 Å film) |
|---|---|---|---|
| 7 | 20% $O_2$—80% Ar discharge plasma RF 100 W | +100 V | 40 Å/min |
| 8 | 20% $O_2$—80% Ar discharge plasma RF 100 W | +20 V | 15 Å/min |
| 9 | 20% $O_2$—80% Ar discharge plasma RF 100 W | 0 V | 10 Å/min |
| 10 | 20% $O_2$—80% Ar discharge plasma RF 200 W | +100 V | 70 Å/min |
| 11 | 20% $O_2$—80% Ar UV radiation | 0 V | 5 Å/min |
| 12 | 50% $CO_2$—50% Ar discharge plasma RF 100 W | +100 V | 50 Å/min |

Figure 2:
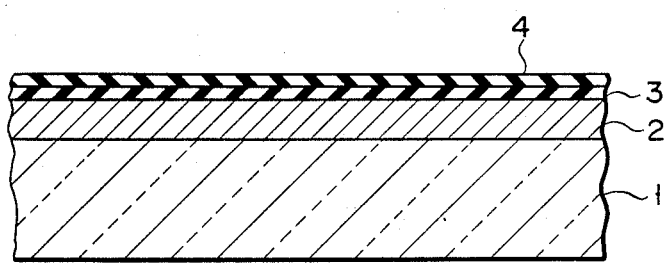
FIG. 2 is a sectional view of a data recording medium according to another embodiment of the present invention.

FIG. 2 shows another embodiment of the present invention. A dielectric film (i.e., the second protective layer) 4 was formed on the protective layer 3 (i.e., the first protective layer) on the recording layer 2 of the the same magnetic recording medium as that of FIG. 1. In this embodiment, the oxidation conditions, film thickness and apparatus for the recording and protective layers 2 and 3 formed on the glass substrate (i.e., the substrate 1) were used in the same manner as in wet anodic oxidation (Table 1). The dielectric film 4 was formed by RF sputtering under the conditions shown in Table 3.

TABLE 3

| Dielectric film | Formation method | Ar gas flow rate (SCCM) | RF power (W) | Sputtering time (min) | Film thickness (Å) |
|---|---|---|---|---|---|
| $SiO_2$ | RF sputtering | 25 | 300 | 10 | 300 |
| SiO | RF sputtering | 25 | 300 | 10 | 300 |
| AlN | RF sputtering | 20 | 300 | 10 | 300 |

Figure 3:
FIG. 3 is a microscopic photograph showing the surface state of a TbFe film, after an anticorrosion test, which is not subjected to anodic oxidation.
Figure 4:
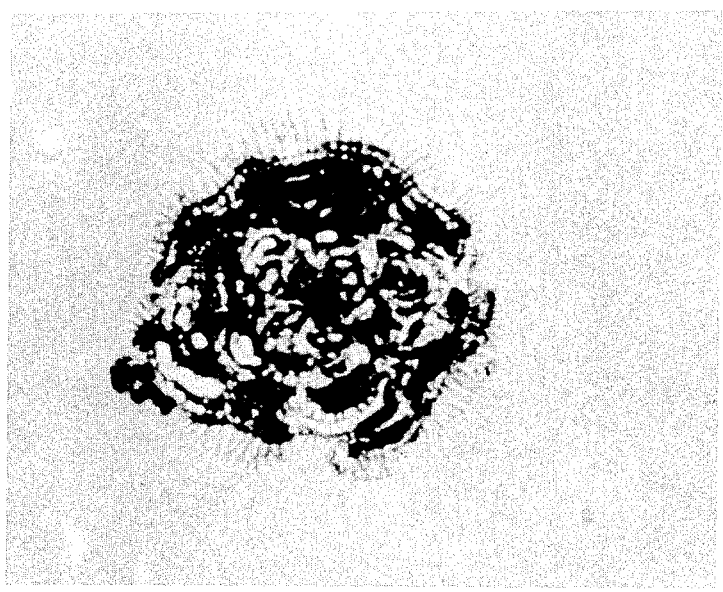
FIG. 4 is a microscopic photograph showing the surface state, after an anticorrosion test, of an $SiO_2$ film formed on the TbFe film which is not subjected to anodic oxidation.

The TbFe film (Sample A) anodic-oxidized by the treatment method of No. 1 in Table 1, the TbFe film (Sample B) anodic-oxidized by the treatment method of No. 7 in Table 2, the TbFe film ($SiO_2$/anodic oxide/TbFe) (Sample C) obtained by forming the second protective layer of $SiO_2$ of Table 3 on the anodic oxide layer of No. 1, the TbFe film (Sample D) coated with $SiO_2$ by electron beam deposition to a thickness of 600 Å, and the TbFe film (Sample E) without the protective film were simultaneously placed in a condition at a temperature of 70° C. and a relative humidity of 85% for 48 hours so as to perform an anticorrosion test. The resultant metal tissues of the surfaces of Samples A, B, C, D and E are examined with a microscope, finding no corrosion in the surface of Samples A, B and C. However, in the surfaces of Samples D and E are recognized significant corrosions as illustrated in FIGS. 3 and 4, respectively. A magnification of each of the microscopic photographs of FIGS. 3 and 4 is 100 times. $SiO_2$ is included in the metal compound category according to the present invention.

No corrosion caused by defects such as pinholes was found in the surfaces of Samples A, B and C of the present invention, and extremely uniform surface states were obtained. However, a bulge due to corrosion was observed for the TbFe film without the protective layer. The TbFe film coated with $SiO_2$ was subject to degradation of the TbFe film at the edge and at pinhole portions.

Coercive forces Hc and saturation magnetization values Ms of Samples A to E as the thin magnetic alloy films as the recording layers measured by a vibration sample magnetometer (VSM), are as shown in Tables 4 and 5, respectively. These Hc and Ms values were measured when a magnetic field was applied in a direction perpendicular to the surface of each TbFe film. It should be noted that the acceleration conditions were the same as those when the surface states were observed.

TABLE 4

| | Coercive force Hc (kOe) | |
|---|---|---|
| Sample | Initial value | After 60 H acceleration |
| A | 2.5 | 2.4 |
| B | 2.5 | 2.4 |
| C | 2.5 | 2.5 |
| D | 2.5 | 1.3 |
| E | 2.5 | 0.5 |

TABLE 5

| | Saturation magnetization Ms (Gauss) | |
|---|---|---|
| Sample | Initial value | After 60 H acceleration |
| A | 60 | 58 |
| B | 60 | 58 |
| C | 60 | 60 |
| D | 60 | 40 |
| E | 60 | 18 |

The Hc and Ms values of the TbFe anodic oxide films are not substantially changed. However, the Hc and Ms values of the TbFe film without anodic oxidation are reduced to 1/5 and ⅓, respectively. The Hc and Ms values of the TbFe film coated with $SiO_2$ are reduced to ½ and ⅔, respectively. The same results as in Samples A, B and C were experimentally confirmed when the treatment methods of Nos. 2 to 6 of Table 1, Nos. 8 to 12 of Table 2 and Nos. 1 to 6 of Table 1 were used to obtain a multilayer protective structure as a combination of the first protective film comprising an anodic oxide film and a second protective layer comprising a dielectric film of Table 2.

According to the data recording medium of the present invention, a surface portion of the recording layer of TbFe or the like is anodic-oxidized to obtain a thin oxide film as a protective film, thereby greatly improving the anticorrosion properties of the recording layer. The resultant protective layer has good adhesion with the recording layer. The protective film will not peel off even in a peel-off test using cellophane tape.

The treatment solutions in Table 1 and the treatment conditions in Tables 2 and 3 can also be applied to other thin amorphous films of a rare earth metal-transition metal alloy such as GdTbFe, TbFeCo or the like in addition to TbFe when anodic oxidation is to be performed.

Furthermore, pH values of the treatment solutions for anodic oxidation fall within the range shown in Table 1, e.g., according to the treatment methods of Nos. 1 to 3, anodic oxide films can be formed without causing active dissolving reactions. Although the treatment methods of Nos. 4 to 6 are subject to the active dissolving reaction of the recording layer, a chemically inactive state is thereafter obtained to form anodic oxide films on the surfaces of the corresponding recording layers. In either case, the surface states are good. When the difference between the spectral reflectances before and after anodic oxidation is measured, the change at a wavelength $\lambda = 830$ nm is less than 5%. Accordingly, there is no problem for a read out operation.

The present invention is not limited to the embodiments described above. In the above embodiments, the recording layer comprises the thin amorphous film structure of a rare earth metal-transition metal alloy as the magneto-optical recording medium. However, the present invention can also be applied to a thin Co-Cr magnetic recording layer. In this case, the surface portion of the recording layer is anodic-oxidized to form a protective layer, thereby obtaining the same effect as in the above embodiments.

What is claimed is:

1. A magneto-optic recording medium having a thin amorphous film of a rare earth metal-transition metal alloy as a recording layer, said recording medium having an axis of easy magnetization along a direction perpendicular to the film surface thereof and a protective layer formed on said recording layer, wherein said protective layer comprises a thin oxide film obtained by the anodic oxidation of the surface portion of the recording layer, said thin oxide film having a thickness of at least 50 Å.

2. A medium according to claim 1, wherein said thin oxide film is formed by anodic oxidation in a gaseous atmosphere.

3. A medium according to claim 2, wherein anodic oxidation in the gaseous atmosphere comprises plasma anodic oxidation using a gas containing oxygen type gas.

4. A medium according to claim 1, wherein said thin oxide film formed by anodic oxidation has a thickness falling within the range of several tens of angstroms to 300 Å.

5. A medium according to claim 4, wherein said thin oxide film has a thickness falling within the range of 50 Å to 300 Å.

6. A medium according to claim 1, wherein said thin oxide film is formed by anodic oxidation in an electrolytic aqueous solution.

7. A medium according to claim 6, wherein said electrolytic aqueous solution is a solution selected from the group consisting of a boric acid solution, a boric acid-borate buffer solution, a phosphoric acid solution, a phosphoric acid-phosphate buffer solution, a solution mixture of ethylene glycol, water and an alkali metal hydroxide and a solution mixture of ethylene glycol, water and a nitrate.

8. A medium according to claim 6, wherein said electrolytic aqueous solution is a solution selected from the group consisting of a formic acid-formate buffer solution, an acetic acid-acetate buffer solution and a propionic acid-propionate buffer solution.

9. A medium according to claim 1, wherein a dielectric film is formed on said thin oxide film.

10. A medium according to claim 9, wherein said dielectric film has a thickness of not less than 50 Å.

11. A medium according to claim 9, wherein said dielectric film comprises at least one member selected from the group consisting of a semiconductor metal oxide film and a semiconductor metal nitride film.

12. A medium according to claim 9, wherein said dielectric film is a film of $Al_2O_3$ or $SiO_2$.

* * * * *